Nov. 27, 1956 H. G. WYSE 2,772,105
WIPER RINGS
Filed Aug. 14, 1952
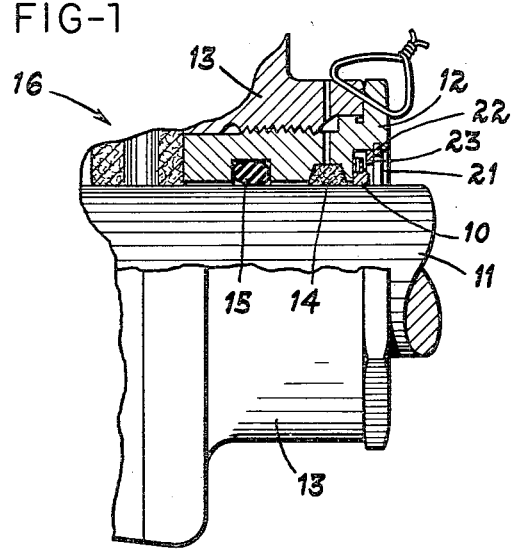
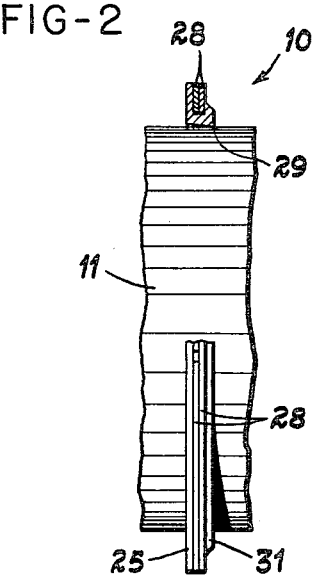
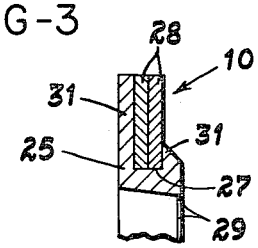
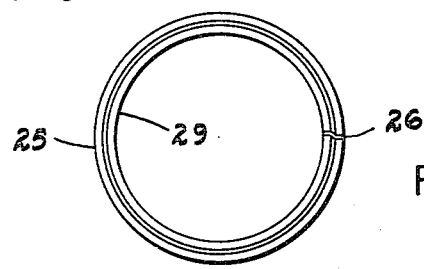
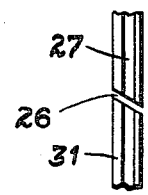
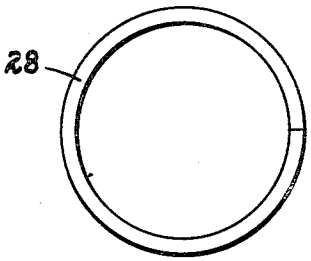
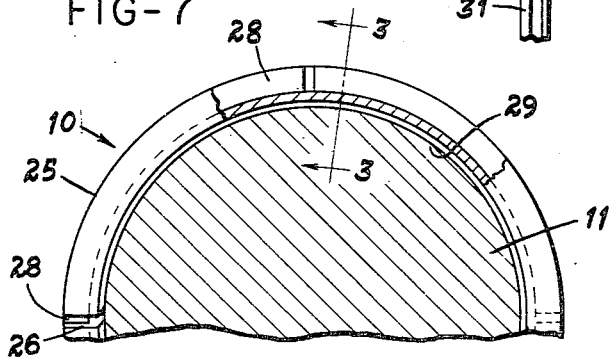
INVENTOR.
HAROLD G. WYSE
BY
ATTORNEYS United States Patent Office 2,772,105
Patented Nov. 27, 1956

2,772,105

WIPER RINGS

Harold Gabriel Wyse, Dayton, Ohio

Application August 14, 1952, Serial No. 304,419

3 Claims. (Cl. 288—14)

This invention relates to wiper rings and more particularly to wiper rings for scraping and cleaning the surface of an axially movable shaft, such as, for example, the sliding rods of hydraulic shock struts and similar equipment forming part of airplane landing gear.

Hydraulic landing gear for airplanes includes cylinders containing a liquid shock-absorbing medium in which a piston may move axially for absorbing the shock of landing. The piston carries a shaft, to the lower end of which the landing wheel is attached; it is adapted to reciprocate with respect to the cylinder and is tightly surrounded at the point at which it slides in and out of the lower end of the cylinder by a packing gland in order to prevent escape of shock absorbing liquid. It is essential for proper functioning of the hydraulic cylinder that all foreign material be kept out and that in operation such material be cleaned entirely from the shaft ahead of the point at which it passes through the packing gland in order to prevent dirt, grit, ice, or other foreign matter from entering the cylinder itself, and also from wearing or scoring either the packing gland or the shaft.

Under modern conditions military aircraft must operate efficiently under conditions of extreme cold in arctic regions and of extreme heat and dampness in the tropics. During long flights aircraft may take off and land under widely varying conditions of terrain, and may be subject to extremes of heat and cold on the ground, and of cold in the upper atmosphere. The extremes of cold to which such hydraulic gear is exposed may be extremely low, so that material freezing to the shaft has a strong tendency to cling thereto. Foreign matter having to be cleaned from the shaft may thus include ice, mud, sand, grit, congealed oil or grease, and similar substances, all of which must be removed from the shaft leaving it perfectly clean before it passes through the packing gland.

The invention is illustrated and described with reference to its embodiment in such a piston or cylinder although it is applicable with similar advantages to many other types of pistons and shafts where analogous problems are involved. It provides for this purpose a relatively simple and highly efficient wiper ring having a thin scraping edge maintained in predetermined substantial pressure contact with the entire circumference of the shaft which will scrape or cut foreign matter from the shaft without appreciable wear on the shaft or undue wear to itself, and will operate efficiently under widely varying conditions of terrain, temperature and weather.

It is accordingly a principal object of the invention to provide a wiper ring which develops substantial pressure against its shaft and will efficiently remove ice, frost, moisture, dirt and other foreign matter from a shaft during reciprocation thereof so as to leave the same substantially completely free from foreign matter.

It is a further object of the invention to provide such a wiper ring of the character described which is certain in operation, is long lived and can be economically manufactured.

Other objects and advantages of the invention will be apparent from the following description, the accompanying drawing and the appended claims.

In the drawings—

Fig. 1 is a view partly in elevation and partly in section illustrating the wiper ring of the invention in operative position in a packing gland assembly for hydraulically operated airplane landing gear;

Fig. 2 is a sectional view, on a larger scale, of the wiper ring of the invention in operative position around a shaft;

Fig. 3 is a sectional view, on a larger scale, on the line 3—3 of Fig. 7;

Fig. 4 is a view of the cleaning ring removed from the shaft viewed from the outer or working face;

Fig. 5 is a view of a portion of the cleaning ring viewed from the outer circumference and showing the split therein;

Fig. 6 is a view of a compression member;

Fig. 7 is a view on a larger scale of a portion of the wiper ring in position on the shaft, partly in section to show compression members in position on the cleaning ring.

Referring to the drawings, which illustrate a preferred embodiment of the invention, Fig. 1 shows a wiper ring 10 in a typical use for cleaning foreign matter from the circumference of shaft 11 as it reciprocates in cylinder bearing 12 of end cap 13 of a hydraulic cylinder, ahead of the point at which the shaft passes through felt wiper 14 and O-ring 15 and an adjustable packing gland assembly indicated diagrammatically at 16.

It is readily apparent that as shaft 11 reciprocates through the felt wiper and the hydraulic packings in operation, any grit, dirt, ice or other foreign matter adhering to its surface could cut or score these relatively soft members and destroy the seal which they form around the circumference of the shaft, permitting both escape of the hydraulic liquid, and possibly also introduction of foreign matter into the hydraulic cylinder itself where it might damage or destroy the cylinder. The wiper ring of the invention successfully removes such material from the shaft 11, maintaining its working edge in tight engagement entirely around the circumference of the shaft, in effect cutting all of such material from the shaft and rendering the exposed part of its working surface completely clean.

As shown, the outer end of the bore in cylinder bearing 12 is of larger diameter than the part which receives shaft 11, and extending radially outward is an annular groove 21 for cooperation with a snap ring 22 and washer 23 for maintaining wiper ring 10 in place.

The wiper ring comprises a scraper or cleaning ring 25 which is split at 26 at an angle to the axis and has around its outer edge a reduced annular portion forming channel or groove 27 for receiving compression member 28 (Figs. 3 and 7).

The surface of the inner circumference of scraper ring 25 is beveled inwardly so as to provide at the lower or outer face thereof a narrow working or bearing edge 29 (Fig. 3) for maintaining tight engagement with the outer circumference of the shaft. Split 26 extends at an angle with respect to the axis of shaft 11 such that when the ring is in position on the shaft a portion of the bearing edge will be in contact with the entire circumference of the shaft and there will be no portion of the circumference which is not scraped by the ring as the shaft reciprocates through it. Cleaning ring 25 may be made of a material such as bronze, brass, copper-silicon-alloy or similar material which is softer than the material of the shaft so that wear resulting from use will occur on the ring rather than on the shaft, while nevertheless being hard enough to perform its scraping and cleaning function and to stand up in operation.

The inner diameter of scraper ring 25 and the width of split 26 should be predetermined with respect to the diameter of shaft 11 so that when the wiper ring is pressed closed on the shaft the edges of split 26 will approach and allow the ring to engage the shaft around the entire circumference thereof.

The scraper ring is maintained in predetermined substantial pressure engagement with the shaft by a number of split rings 28 received in groove 27, as shown. Each of such rings is a flat ring of solid section of steel or other suitable tensile material such as a punching which is relatively thin axially and has a greater radial than axial dimension, with a normal internal diameter slightly less than the outside diameter of groove 27. Accordingly when the ring is received in the groove it will be deformed slightly and will tend to close tightly and thus press against the reduced annular portion forming the bottom of channel or groove 27 and urge cleaning ring 25 into closed position with its bearing edge 29 in engagement around the entire circumference of shaft 11 and bearing thereon with substantially constant, uniform pressure at all points in a plane substantially perpendicular with the axis of shaft 11.

In assembling the wiper ring, the splits in the compression rings 28 should be spaced from split 26 in cleaning ring 25 in order to increase the effectiveness of its pressure thereon, and when several such split rings are used in groove 27, their respective splits should also be spaced from each other for proper equalization of pressure around the reduced bottom portion of the groove. Additionally, in order to facilitate assembly without unduly deforming split rings 28, one of the flanges 31 formed by groove 27 at the outer edge of the cleaning ring may be of substantially less circumference than the other, as shown in the drawing.

Groove 27 should be so dimensioned with respect to the axial thickness of split ring 28 that a predetermined number of the split rings will fit snugly but not bindingly in the groove in order to prevent planar displacement of bearing edge 29 at split 26 in operation. By reason of their solid section construction the split rings are somewhat rigid and exercise a firm substantial pressure against the bottom of groove 27. Additionally, the outer diameter of the split rings may preferably be of the same size as that of the cleaning ring, to give a finished appearance, and it should not be any greater than that of the cleaning ring in order that the split rings will not extend beyond the outer edge of the groove in order that the wiper ring may be wholly self-contained, without projecting parts, and will thus fit and operate properly in a bore of any size having a diameter greater than its own outside diameter.

With the present construction close and exact control of the pressure of the scraper or cleaning ring against the circumference of the shaft is made possible to provide a degree of pressure desirable for proper performance without any excess of pressure which would cause undue wear. A high degree of uniformity in commercial manufacture is also possible so that scraper rings in accordance with the invention exercise a soft, firm, uniform scraping or wiping pressure.

The construction is of particular advantage in the smaller sizes, for example in wiper rings having an inside diameter from about ½ inch to about 1½ inches. A well-recognized test for the pressure exerted by rings of this type is the so-called breakout friction test, in which the scraper ring is maintained in horizontal position in a suitable support, fitted in operative position around a gage rod having a highly accurate surface finish and of the same diameter as the shaft to be cleaned. A load is applied to the gage at a rate not to exceed 1 pound per second, and the ring is rated in accordance with the minimum load required to move the gage a minimum of 1 inch. Scraper rings in accordance with the invention tested in this manner exercise a pressure for properly scraping the rod, but not substantially in excess of such amount, scraper rings having an inside diameter up to 1½ inches exerting a pressure or gripping the rod, for example, not in excess of 4 pounds.

It will thus be seen that when the wiper ring of the invention is in position on a shaft, its bearing edge bears tightly against the shaft around the entire circumference thereof. The slit, extending angularly with respect to the axis of the shaft, is not in a straight line with respect to such axis and accordingly some portion of such bearing edge bears around the entire circumference of the shaft and cleans it. By reason of the narrowness of the edge the working face of the wiper ring bears sharply and closely against the circumference of the shaft and effectively cleans from the shaft not only material such as sand or grit which has become loosely attached thereto but other material such as congealed oil or particles of ice and even extremely thin films of such material which have a strong tendency to cling thereto and have in effect to be cut from the shaft.

Inasmuch as substantially uniform pressure is applied around the entire circumference of the ring in a radially inward direction, the pressure of the bearing edge on the circumference of the shaft is substantially equal at all points, and this factor, together with the close adjustment of the amount of pressure made possible by the construction, tend to reduce wear of the ring to a minimum. Wiper rings made in accordance with the invention have proved very satisfactory, and to have an unusually long life. Even after having been operated through 150,000 cycles on a testing mandrel, for example, the bearing edge of test rings of the invention have shown a flat bearing area of only 1/64 of an inch in axial extent.

While the apparatus herein described constitutes a preferred embodiment of the invention it is to be understood that the invention is not limited to this precise apparatus and changes may be made therein without departing from the scope of the invention which is defined in the appended claims.

What is claimed is:

1. A wiper ring for scraping and cleaning the surface of an axially movable shaft with substantial pressure equally distributed around the entire circumferential surface thereof, comprising a cleaning ring having a split therein extending angularly with respect to the axis thereof, said cleaning ring having its interior surface tapered inwardly forming a narrow working edge adapted to bear against said shaft, the outer surface of said cleaning ring being provided with a groove the base of which has a predetermined outside diameter, and at least one axially thin non-continuous relatively rigid radially deformable ring of metal received in said groove on edge under tension, said non-continuous ring having a solid cross-section radially of said shaft, a normal inside diameter less than the outside diameter of the bottom of said groove for compressing said cleaning ring into uniform pressure scraping contact with said shaft solely by the internal tension developed by deforming said non-continuous ring, and an outside diameter no greater than the outside diameter of said cleaning ring the split in said cleaning ring being spaced circumferentially from the break in said noncontinuous ring for effecting said uniform pressure scraping contact.

2. A wiper ring for scraping and cleaning the surface of an axially movable shaft with substantial pressure equally distributed around the entire circumferential surface thereof, comprising a cleaning ring having a split therein extending angularly with respect to the axis thereof, said cleaning ring having its interior surface tapered inwardly forming a narrow working edge adapted to bear against said shaft, a reduced annular portion on the outer edge of said ring having a predetermined outside diameter, a plurality of solid section split stiff metal rings having a normal inside diameter less than the outside diameter of said reduced annular portion deformably received on said reduced annular portion in compressing relation with respect to said cleaning ring solely by reason of internal stress resulting from deforming thereof, the splits in said split rings being spaced circumferentially from the split in said cleaning ring and from the splits in each other to compress said cleaning ring uniformly into pressure scraping contact with said shaft, and means for retaining said split rings on said reduced annular portion in use.

3. A wiper ring for scraping and cleaning the surface of an axially movable shaft with substantial pressure equally distributed around the entire circumferential surface thereof, comprising a cleaning ring having a split therein extending angularly with respect to the axis thereof, said cleaning ring having its interior surface tapered inwardly forming a narrow working edge adapted to bear against said shaft, a reduced annular portion on the outer edge of said cleaning ring having a predetermined outside diameter, a plurality of solid section relatively rigid split metal rings having a normal inside diameter less than the outside diameter of said reduced annular portion deformably received on said reduced annular portion in compressing relation with respect to said cleaning ring solely by reason of internal stress resulting from deforming thereof, the splits in said split rings being spaced circumferentially from the split in said cleaning ring and from the splits in each other to compress said cleaning ring uniformly into pressure scraping contact with said shaft, said cleaning ring having flanges on both sides of said reduced annular portion for retaining said split rings thereon in use.

References Cited in the file of this patent

UNITED STATES PATENTS

| | | |
|---|---|---|
| 924,755 | Franke | June 15, 1909 |
| 1,010,212 | Anderson | Nov. 28, 1911 |
| 1,327,801 | Blache | Jan. 13, 1920 |
| 2,473,470 | Fall | June 14, 1949 |

FOREIGN PATENTS

| | | |
|---|---|---|
| 452,383 | Great Britain | Aug. 21, 1936 |
| 566,064 | Germany | Dec. 9, 1932 |